United States Patent [19]

Muller

[11] Patent Number: 4,974,954
[45] Date of Patent: Dec. 4, 1990

[54] SPECTACLES WITH SWING ARM REAR VISION ELEMENTS

[75] Inventor: George H. Muller, Long Boat Key, Fla.

[73] Assignee: Joseph J. Berke, West Bloomfield, Mich.

[21] Appl. No.: 302,004

[22] Filed: Jan. 26, 1989

[51] Int. Cl.$^5$ ............................................. G02C 7/14
[52] U.S. Cl. ..................................... 351/50; 350/638
[58] Field of Search ................... 351/50, 158; 350/638

[56] References Cited

U.S. PATENT DOCUMENTS 4,603,944 8/1986 Greenlaw et al. .................... 351/50

FOREIGN PATENT DOCUMENTS 2104236 3/1983 United Kingdom .................. 351/50

Primary Examiner—Rodney B. Bovernick
Attorney, Agent, or Firm—Alex Rhodes

[57] ABSTRACT

A pair of spectacles which enable a forward facing user to view objects behind the user. A pair of swing arms is rotatably attached to the forward portion of the spectacles' temples. The swing arms are thin narrow members whose shapes are similar to the temples. A rear vision member is connected by a spherical joint to one end of each swing arm. The swing arms are individually rotatable in one direction for positioning the rear vision members at operative positions ahead of the spectacles' eyepiece and rotatable in the opposite direction for storing the swing arms and rear vision members behind the eyepiece. At the stored positions, the swing arms and rear vision members are adjacent to the outer surface of the temples and aligned with the temples. The spectacles have the appearance of a conventional pair of spectacles when the swing arms and rear vision members are at their stored positions. In the first aspect of the invention, the swing arms are rotatable about horizontal axes disposed in transverse relationship to the temples. In the second aspect of the invention, the swing arms are rotatable about vertical axes disposed in parallel relationship to the temples.

10 Claims, 2 Drawing Sheets

4,974,954

SPECTACLES WITH SWING ARM REAR VISION ELEMENTS

BACKGROUND OF THE INVENTION

This invention relates to spectacles and more particularly to spectacles which enable forward facing users to view objects behind the users.

In the co-pending application of Berke et al, Ser. No. 07/243,871, now U.S. Pat. No. 4,896,956 it was noted that rear vision spectacles would entertain as well as improve the safety of motorists, motorcyclists, bicyclists, joggers, industrial workers, servicemen, policemen and pedestrians. It was also noted that although rear vision spectacles would serve these ends, prior concepts have failed because of their unusual, unsightly appearances and/or functional deficiencies.

In the referenced application a construction is disclosed having a pair of unitary folded rear vision members, with reflective rear viewing surfaces attached to an eyepiece. The rear vision members are rotatable about axes which are in intermediate relationship to the ends of the eyepiece. At their operative positions, the rear vision members are rotated away from the eyepiece to positions forward of the eyepiece whereat their rear viewing surfaces are visible to the user. At their stored positions, the rear vision members are rotated towards the eyepiece whereat the spectacles have the appearance of a conventional type of spectacles.

Although the Berke spectacles are an improvement over the prior art, they have several limitations which the present invention overcomes. One limitation is that the maximum distance ahead of the eyepiece at which rear viewing surfaces can be provided is restricted. It is desirable to position the rear viewing surfaces well forward of the eyepiece to reduce eye rotation while viewing rearward. Reduced eye rotation lessens user fatigue and the distraction of rear viewing with a user's forward vision. It would also increase the user's rear field of vision.

A second limitation of the Berke spectacles is that the angular and lateral positions of the rear viewing surfaces cannot be independently adjusted. A third limitation is that the rear vision members cannot be adapted to existing spectacles without changes to their eyepieces.

With the foregoing in mind, the benefits of the present invention will be appreciated.

SUMMARY OF THE INVENTION

The present invention is a pair of rear vision spectacles with temple mounted swing arm rear vision members which are rotatable in one direction to position rear viewing surfaces at operative positions forward of the spectacles' eyepiece and are rotatable in the opposite direction to position the rear viewing surfaces at stored positions adjacent to the outer surfaces of the temples. One benefit of the invention is that it can be readily and economically applied to existing spectacles. Another benefit is that the rear vision members can be mounted on an existing pair of spectacles without changes to the spectacles' eyepiece. Another benefit, in addition to the foregoing benefits, is that the appearance of spectacles which embody the invention is conventional when the rear vision members are at their stored positions. Still yet another benefit is that the spectacles can be stored in conventional eyeglass cases.

One feature of the invention is that the rear viewing surfaces can be positioned far ahead of the spectacles' eyepiece. This feature increases the rear field of vision and reduces eye rotation when viewing rearwardly. Another feature, in addition to the foregoing feature, is that the angular and lateral positions of the rear viewing surfaces can be independently adjusted at their operative positions. The swing arms are thin narrow symmetrically opposite members whose shapes are preferably similar to the spectacles' temples. The swing arms are rotatably mounted at one end portion thereof to the forward portions of the spectacles' temples. At the other en portions of the swing arms are spherical joints which connect the swing arms to rear vision members. One surface of the rear vision members is reflective for viewing rearwardly.

At their operative positions, the swing arms extend forwardly of the eyepiece and at their stored positions the swing arms are rearwardly of the eyepiece, aligned with and adjacent to the temples.

In the first aspect of the invention, the axes about which the swing arms are rotatable are horizontal and transverse to the temples. In the second aspect of the invention, the axes of rotation of the swing arms are vertical and parallel to the temples. In still yet another aspect, a means is provided for adjusting the position of the rear vision members fore and aft with respect to the eyepiece.

It is a primary object of the invention to provide a fashionable, effective, easy to use pair of rear vision spectacles which will be widely accepted by the public.

Further features, benefits, objects and manner of using the invention will be understood from the ensuing description and drawings which disclose the invention in detail.

DETAILED DESCRIPTION OF THE PREFERRED EMBODIMENT

Figure 1:
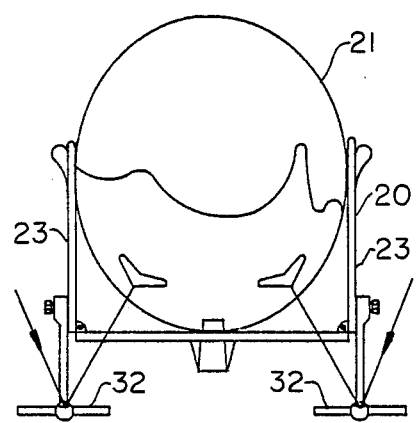
FIG. 1 is a plan view of a pair of swing arm rear vision spectacles with their rear vision members at their operative positions.
Figure 2:
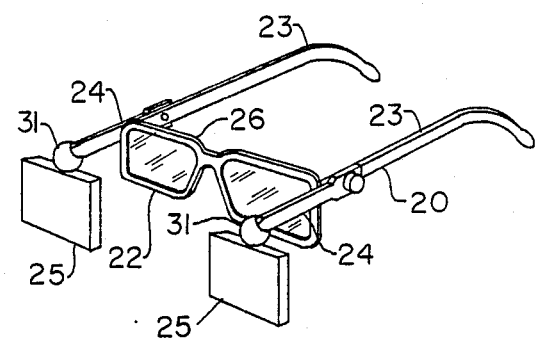
FIG. 2 is a perspective view of the spectacles of FIG. 1.
Figure 4:
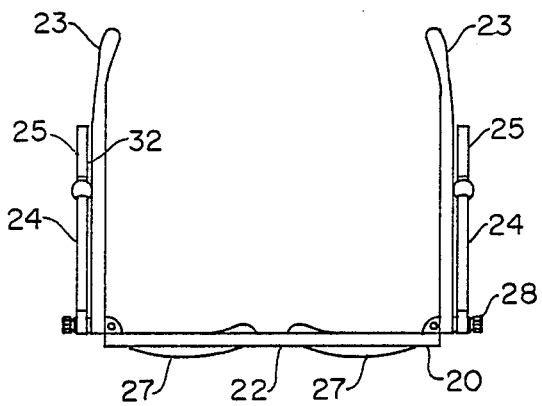
FIG. 4 is a plan view of the spectacles showing the rear vision elements at their stored positions.

Referring now to the drawings, wherein like numerals designate like and corresponding parts throughout the several views, and in particular to FIGS. 1 through 6, a pair of spectacles 20 is illustrated therein for viewing objects behind a forward facing user 21. The spectacles 20 comprise an eyepiece 22, symmetrically opposite temples 23 rotatably attached to opposite end portions of the eyepiece 22, swing arms 24 attached to the temples 23 and rear vision members 25 attached to the swing arms 24.

Figure 3:
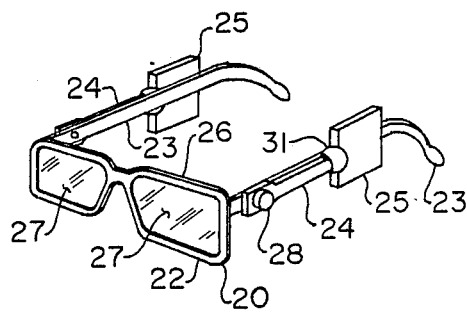
FIG. 3 is a perspective view of the spectacles showing the rear vision members at their stored positions.
Figure 5:
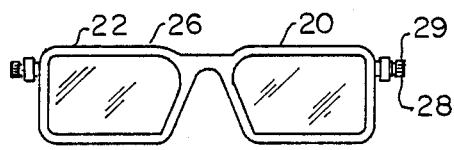
FIG. 5 is a front view of the spectacles shown in FIG. 4.
Figure 6:
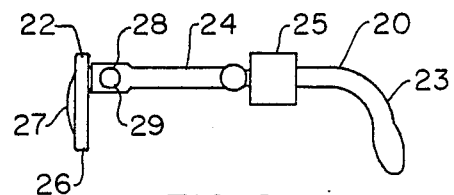
FIG. 6 is a left side view of the spectacles shown in FIG. 4.

The eyepiece 22 is conventional and includes a frame 26 and a pair of lenses 27 mounted in the frame 26. The lenses 27 may be any type, including refractive lenses, safety lenses, and tinted lenses. The swing arms 24 are slender members with overall shapes preferably similar to the temples 23. When the swing arms 24 and rear vision members 25 are at their non-operative stored positions, as shown in FIG. 3, the spectacles 20 have the same appearance as a conventional pair of spectacles.

At the forward end of each temple 23 there is a horizontal pivot screw 28 which threadably engages the temple 23. The pivot screw 28 defines a horizontal pivot axis which is transverse to the temple 23. One of the swing arms 24 is rotatably mounted on the pivot screw 28 and is forwardly rotatable on said screw 28 to the operative position shown in FIG. 2, forward of the eyepiece, and rearwardly rotatable on said screw 28 from said operative position to the stored position shown in FIG. 6 which is adjacent to the temple 23.

The pivot screw 28 has a large head 29 for finger loosening and tightening to adjust and fix the position of the swing arm 24 on the temple 23. An alternative to loosening and tightening the screw 28 is a conventional resilient means (not shown) such as a spring washer interposed between the screw head 29 and swing arm 24.

At the other end of the swing arm 24 is a spherical joint 31 which connects the swing arm 24 to one of the rear vision members 25. The shape of the rear vision member 25, shown for purposes of illustration, is rectangular, but may be another, including by way of example, circular or oval. One surface 32 of the member 25 is reflective for rear viewing. At the operative forward extending positions of the arms 24, the rear vision members 25 are rotated by the user 21 to adjust the rear field of vision.

The swing arms 24 may be rotated upwardly and downwardly and the rear vision members 25 may be rotated in any direction about the centers of the spherical joints 31. This feature provides the user 21 with a substantial latitude for adjusting his rear field of vision. At the operative positions of the members 25, their rear viewing surfaces 32 are substantially forward Of the eyepiece 22 and visible through the lenses 27. Viewing the reflective surfaces 32 through the lenses 27 provides the advantage of correcting the user's rear vision as well as minimizing distraction with forward vision. When viewing rearward, the substantially forward position of the rear viewing surfaces 32 also increases the rear field of vision and reduces the rotation of the user's eyes.

Figure 7:
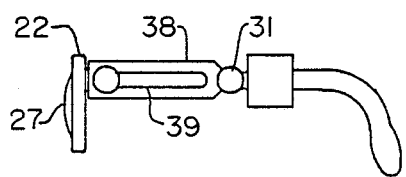
FIG. 7 is an alternate embodiment of the invention with provisions for adjusting the swing arms forwardly and rearwardly on the spectacles.

Referring now to FIG. 7, an optional means is shown for adjusting the swing arms 38 forwardly and rearwardly on the temples 23. Slotted apertures 39 are provided in the swing arms which engage the pivot screws 28. When the pivot screws 28 are loosened, the arms 38 are moveable fore and aft as well as rotatable on the screws 28.

Figure 8:
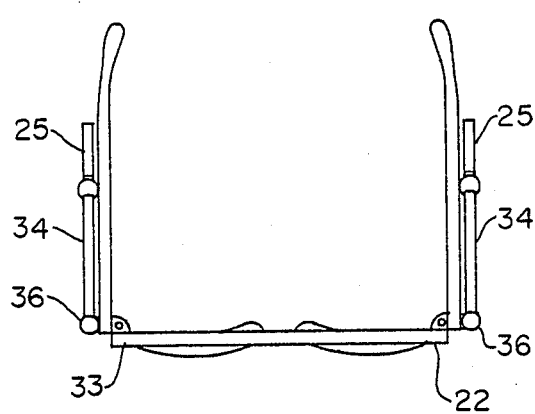
FIG. 8 is a plan view of an alternate embodiment having swing arms rotatable about vertical axes at their stored positions.
Figure 9:
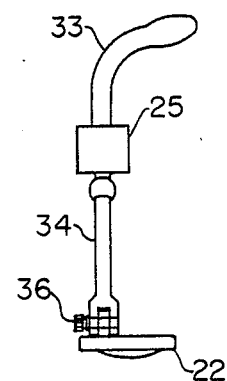
FIG. 9 is a left side view of the alternate embodiment shown in FIG. 8.
Figure 10:
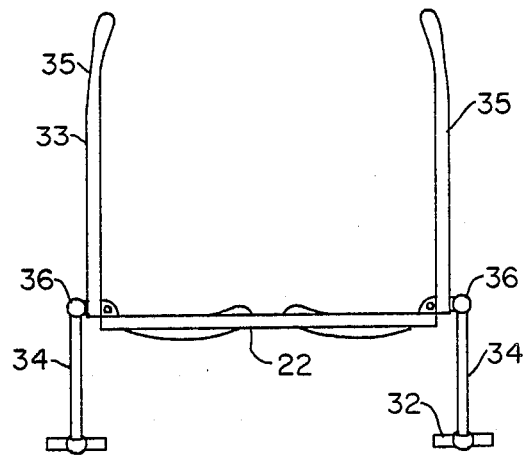
FIG. 10 is a plan view of the alternate embodiment of FIG. 8 with the swing arms at their operative positions.

In FIGS. 8 through 10, inclusive, an embodiment 33 is shown wherein the pivot axes of the swing arms 34 are vertical and parallel to the temples 35. At the forward end portions of the temples 35 are vertical pivot screws 36 which threadably engage the temples. The pivot screws 36 define vertical pivot axes and rotatably attach the end portions of the swing arms 34 to the temples 35.

The swing arms 34 are outwardly rotatable on said screws 36 to the operative positions shown in FIG. 10, forward of the eyepiece 22, and are inwardly rotatable on said screws 36 from said operative positions to the stored positions shown in FIG. 8, adjacent to the temples 35.

Figure 11:
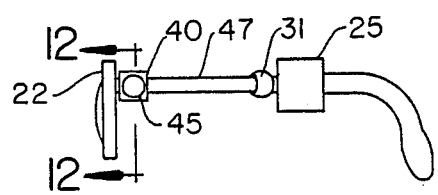
FIG. 11 is a left side view of another embodiment which is adapted to be detachably mounted to a temple of an existing pair of spectacles.
Figure 12:
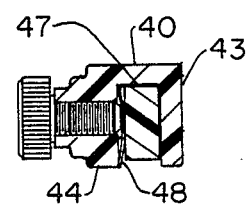
FIG. 12 is a cross-sectional view taken on the line 12—12 of FIG. 11 drawn to an enlarged scale.

With reference to FIGS. 11 and 12, an embodiment 40 is shown which is adapted to be detachably mounted on the temples 41 of an existing pair of spectacles 42. The detachable embodiment 40 is comprised of a U-shaped bracket 43 having a pair of spaced apart vertical legs and an interconnecting vertical portion, a swing arm rotatably mounted to one end portion thereof to one of the vertical legs 44, a pivot screw 45 threadably engaging the outer leg 46 of the U-shaped bracket 43 for rotatably mounting a swing arm 47, a spherical joint 31 attached to the other end portion of the swing arm 24 and a rear vision member 25 connected by the spherical joint 31 to the swing arm 24. The legs 44 of the U-shaped bracket are preferably biased resiliently inwardly with a spring 48 to clamp the bracket 43 to the temple 41.

From the foregoing it will be appreciated that the subject invention is a fashionable, effective, easy to use pair of rear vision spectacles for viewing objects behind a forward facing user. Moreover, the invention is readily and economically adaptable to existing spectacles.

Inasmuch as only several embodiments have been illustrated and described, it will be understood that other embodiments can be provided by changes in the material, size, shape and arrangement of parts without departing from the spirit thereof.

I claim:

1. A pair of spectacles for the rearward viewing of objects by a forward facing user, comprising, in combination: a frame; at least one lens mounted in said frame; a pair of temples attached to opposite end portions of said frame; at least one swing arm rotatably attached to the outer side of one of said temples, said swing arm being angularly adjustable about a horizontal axis to position a rear vision member mounted on the end of said arm ahead of said eyepiece, to adjust said rear vision member vertically and to store said arm and said rear vision member behind said eyepiece adjacent to the other side of said temple; a rear vision member attached to the end portion of said arm, said rear vision member having a reflective surface for rearward viewing; and a means for rotatably attaching said rear vision member to said end of said arm, such that said reflective surface can be positioned in confronting relationship to said forward facing user for viewing objects behind the user.

2. The spectacles as recited in claim 1 further comprising a second arm rotatably attached to the outer side of the other of said temples, said second arm being angularly adjustable about a horizontal axis to position a second rear vision member mounted on the end of said second arm ahead of said eyepiece and to adjust said second rear vision member vertically and to store said second arm and said rear vision member behind said eyepiece adjacent to the outer side of said other temple; a second rear vision member attached to the end portion of said arm, said second rear vision member having a reflective surface for rearward viewing; and a means for rotatably attaching said second rear vision member to the said end of said second arm, such that said reflective surface can be positioned in confronting relationship to said forward facing user for viewing objects behind the user.

3. The spectacles as recited in claim 1 further comprising a means for adjusting said rear vision member forwardly and rearwardly on said swing arm.

4. The spectacles as recited in claim 1 wherein said means for rotatably mounting said rear vision member to said end of said arm is a spherical joint.

5. The spectacles as recited in claim 1 wherein said lens is a refractive lens.

6. The spectacles as recited in claim 1 wherein said lens is a tinted lens.

7. The spectacles as recited in claim 1 wherein said lens is a safety lens.

8. The spectacles as recited in claim 1 further comprising a means for adjusting said rear vision members forwardly and rearwardly on said arms.

9. A pair of spectacles for the rearward viewing of objects by a forward facing user, comprising, in combination: a frame; a pair of lenses mounted in said frame; a pair of temples rotatably attached to opposite end portions of said frame; a pair of arms attached to the sides of said temples for angular rotation about fixed horizontal pivot axes passing through said temples to forward extending operative vertical positions ahead of said frame and angular rotation about said pivot axes to rearward extending stored positions adjacent to the sides of said temples, said arms having slotted apertures for adjusting said arms forwardly and rearwardly with respect to said fixed pivot axes; a rear vision member rotatably mounted on one end of each of said arms, said rear vision members having reflective surfaces for viewing objects behind the user; and a means for rotatably mounting said rear vision members to the said ends of said arms such that said reflective surfaces can be positioned in confronting relationship to the forward facing user.

10. In combination with a pair of spectacles of the type having a frame, a pair of lenses mounted in the frame and a pair of temples rotatably mounted to the ends of the frame, a detachable means for enabling a forward facing user to view objects behind the user, said means comprising: a bracket which is adapted to be detachably mounted to a side of one of the spectacles' temples, a swing arm rotatably attached to said bracket, said arm being angularly rotatable about a horizontal axis to position a rear vision member at operative vertical positions ahead of said spectacles and being angularly rotatable about said horizontal axis to position said temple and rear vision member at a stored position adjacent to the side of said temple; a rear vision member having a reflective surface for viewing rearwardly rotatably mounted to one end of said swing arm; and a means for rotatably mounting said rear viewing member to said arm to position said reflecting surface in confronting relationship to said user.

* * * * *